US006993002B2

(12) United States Patent
Pan et al.

(10) Patent No.: US 6,993,002 B2
(45) Date of Patent: Jan. 31, 2006

(54) CODE POWER MEASUREMENT FOR DYNAMIC CHANNEL ALLOCATION

(75) Inventors: Jung-Lin Pan, Selden, NY (US); Ariela Zeira, Huntington, NY (US)

(73) Assignee: InterDigital Technology Corp., Wilmington, DE (US)

( * ) Notice: Subject to any disclaimer, the term of this patent is extended or adjusted under 35 U.S.C. 154(b) by 920 days.

(21) Appl. No.: 09/901,289

(22) Filed: Jul. 9, 2001

(65) Prior Publication Data

US 2002/0003782 A1 Jan. 10, 2002

Related U.S. Application Data

(60) Provisional application No. 60/217,093, filed on Jul. 10, 2000.

(51) Int. Cl.
H04B 7/216 (2006.01)
(52) U.S. Cl. .................. 370/335; 370/329; 370/320
(58) Field of Classification Search ............. 370/431, 370/437, 441, 329, 332, 341, 315
See application file for complete search history.

(56) References Cited

U.S. PATENT DOCUMENTS

| 5,420,850 | A | 5/1995 | Umeda et al. | |
|---|---|---|---|---|
| 5,533,013 | A | 7/1996 | Leppanen | |
| 6,421,380 | B1 * | 7/2002 | Gu et al. | 375/232 |
| 6,580,703 | B1 * | 6/2003 | Okubo et al. | 370/335 |
| 6,694,141 | B1 * | 2/2004 | Pulkkinen et al. | 455/454 |
| 2002/0003782 | A1 * | 1/2002 | Pan et al. | 370/280 |
| 2003/0016641 | A1 * | 1/2003 | Terry et al. | 370/335 |

FOREIGN PATENT DOCUMENTS

| EP | 1176730 | * 7/2000 | |
|---|---|---|---|
| EP | 1 087 630 | | 3/2001 |
| EP | 1087630 | | 3/2001 |
| GB | 2 320 648 | | 6/1998 |
| GB | 2320648 | | 6/1998 |
| JP | 06268576 A | | 9/1994 |

OTHER PUBLICATIONS

Essam Sourour, "Time Slot Assignment Techniques for TDMA Digital Cellular Systems," IEEE Transactions on Vehicular Technology, vol. 43, No. 1, Feb. 1994, pp. 121-127.

Hitoshi Takanashi, Tomoyoshi Oono & Toshiaki Tanaka, "Frequency-Segregated Dynamic Channel Allocation for Asynchronized TDMA/TDD Frame Among Base Stations," IEEE, 1996, pp. 933-937.

Yoshitaka Hara, Toshihisa Nabetani & Shinsuke Hara, "Time Slot Assignment for Cellular SDMA/TDMA Systems with Antenna Arrays," YRP Mobile Telecommunications Key Telecommunications Key Technology Research Laboratories Co., Ltd., pp. 1-4.

(Continued)

Primary Examiner—Duc Ho
Assistant Examiner—Thien Tran
(74) Attorney, Agent, or Firm—Volpe and Koenig, P.C.

(57) ABSTRACT

Resource units are assigned within a cell of a wireless time division duplex communication system using code division multiple access. Each resource units is associated with a time slot and a code. For selected ones of the cell's resource units, the code interference level is measured during that unit's time slot and using that unit's code. The code interference level is compared to a threshold to determine whether that unit has an acceptable code interference level. Resource units are assigned to communications out of the unit's having acceptable interference levels.

13 Claims, 8 Drawing Sheets

OTHER PUBLICATIONS

Thit Minn & Kai-Yeung Siu, "Dynamic Assignment of Orthogonal Variable-Spreading-Factor Codes in W-CDMA," IEEE, 2000, pp. 1429-1439.

Mihailescu C. et al., Dynamic resource allocation for packet transmission in UMTS TDD-CDMA systems:, Vehicular Technology Conference, 1999 IEEE 49th Houston, TX, USA May 16-20, 1999, Piscataway, NJ, USA, IEEE, US, May 16, 1999, pp. 1737-1741, XP010342115, ISBN: 0-7803-5565-2.

Mihailescu et al., "Dynamic Resource Allocation for Packet Transmission in UMTS TDD-CDMA Systems", Vehicular Technology Conference, 1999 IEEE 49th Houston TX, USA, May 16, 1999, pp. 1737-1741; ISBN: 0-7803-5565-2.

Sourour, "Time Slot Assignment Techniques for TDMA Digital Cellular Systems", IEEE Transactions on Vehicular Technology, vol. 43 No. 1, Feb. 1994, pp. 121-127.

Takanashi et al., "Frequency-Segregated Dynamic Channel Allocation for Asynchronized TDMA/TDD Frame Among Base Stations", IEEE, 1996, pp. 933-937.

Hara et al., "Time Slot Assignment for Cellular SDMA/TDMA Systems with Antenna Arrays", TRP Mobile Telecommunications Key Technology Research Laboratories Co., Ltd.; pp. 1-4.

Minn et al., "Dynamic Assignment for Orthogonal Variable-Spreading-Factor Codes in W-CDMA", IEEE 2000, pp. 1429-1439.

* cited by examiner

PREFERENCE MATRIX 92

| CHANNEL CODE | TIME SLOT | | | | | | | | | | | | | | |
|---|---|---|---|---|---|---|---|---|---|---|---|---|---|---|---|
| | S1 | S2 | S3 | S4 | S5 | S6 | S7 | S8 | S9 | S10 | S11 | S12 | S13 | S14 | S15 |
| CODE 1 | x | x | x | x | 5 | 6 | 4 | x | 8 | x | 8 | 8 | 8 | x | x |
| CODE 2 | x | x | 1 | x | x | 4 | x | x | x | x | 7 | 5 | x | x | x |
| CODE 3 | x | x | 3 | x | x | 5 | x | x | x | x | 8 | 4 | x | 4 | x |
| CODE 4 | x | 5 | 3 | x | x | x | x | x | 6 | x | 8 | 6 | x | 4 | x |
| CODE 5 | x | 5 | x | x | x | x | 4 | x | 5 | x | 10 | 6 | 3 | 4 | x |
| CODE 6 | x | 5 | x | x | x | 5 | 3 | x | 5 | x | x | 8 | 3 | x | x |
| CODE 7 | x | 5 | x | x | 5 | 5 | x | x | 4 | x | x | 5 | 3 | x | x |
| CODE 8 | x | 4 | x | x | 5 | 6 | x | x | 5 | x | x | x | 8 | x | x |
| CODE 9 | x | x | 4 | x | 5 | 4 | x | x | 8 | x | x | x | x | x | x |
| CODE 10 | x | x | 4 | x | 5 | 5 | 4 | x | x | x | x | x | x | 4 | x |
| CODE 11 | x | x | 3 | x | 3 | x | 3 | x | x | x | x | x | x | 4 | x |
| CODE 12 | x | x | x | x | x | x | x | x | x | x | x | x | x | x | x |
| CODE 13 | x | x | x | x | x | x | x | x | x | x | x | x | x | x | x |
| CODE 14 | x | x | x | x | x | x | x | x | x | x | x | x | x | 4 | x |
| CODE 15 | x | x | x | x | x | x | 3 | x | x | x | 5 | x | x | 4 | x |
| CODE 16 | x | x | x | x | x | x | 4 | x | x | x | 5 | x | x | 4 | x |

CODE POWER MEASUREMENT FOR DYNAMIC CHANNEL ALLOCATION

This application claims priority from Provisional Application No. 60/217,093, filed Jul. 10, 2000.

BACKGROUND

The invention relates generally to resource allocation in wireless spread spectrum time division duplex communication systems using code division multiple access. More specifically, the invention relates to assigning time slots and codes in such systems.

Figure 1:
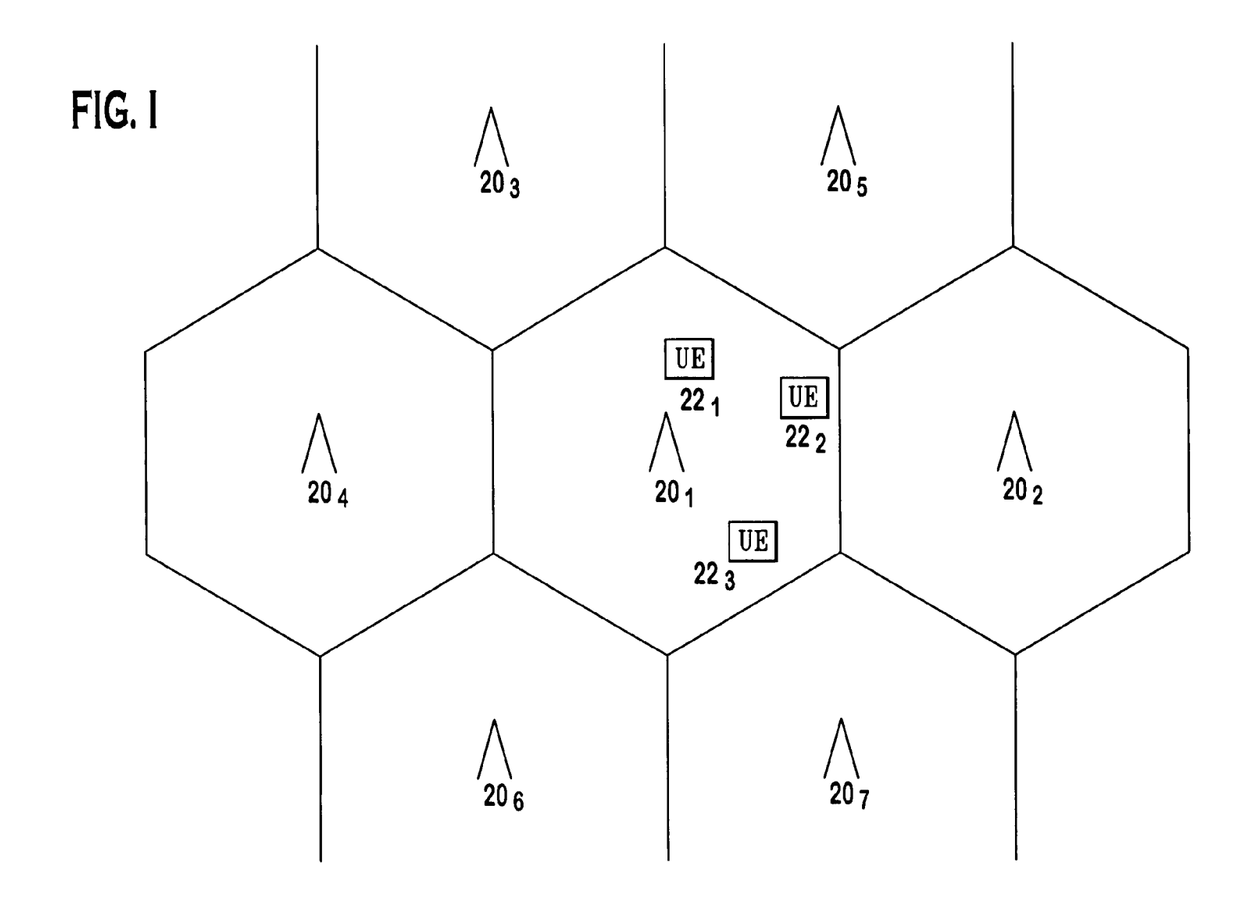
FIG. 1 is a wireless spread spectrum TDD/CDMA system.

FIG. 1 depicts a wireless spread spectrum time division duplex (TDD) communication system using code division multiple access (CDMA). The system has a plurality of base stations $20_1$–$20_7$. Each base station $20_1$, communicates with user equipments (UEs) $22_1$–$22_3$ in its operating area or cell. Communications transmitted from the base station $20_1$ to the UE $22_1$ are referred to as downlink communications and communications transmitted from the UE $22_1$ to the base station $20_1$ are referred to as uplink communications. In addition to communicating over different frequency spectrums, spread spectrum TDD/CDMA systems carry multiple communications over the same spectrum. The multiple signals are distinguished by their respective codes.

Since a signal sent using a particular code is distinguishable from other signals in the same spectrum, each code creates a virtual communication channel within the spectrum. For use in distinguishing signals originating from different cells, each base station $20_1$–$20_7$ has an assigned scrambling code, $c^*_{scramb}$. To transmit a specific data signal in such a system, the data signal is mixed with its base station's scrambling code, $c^*_{scramb}$, and spread using its assigned channel code.

Figure 2:
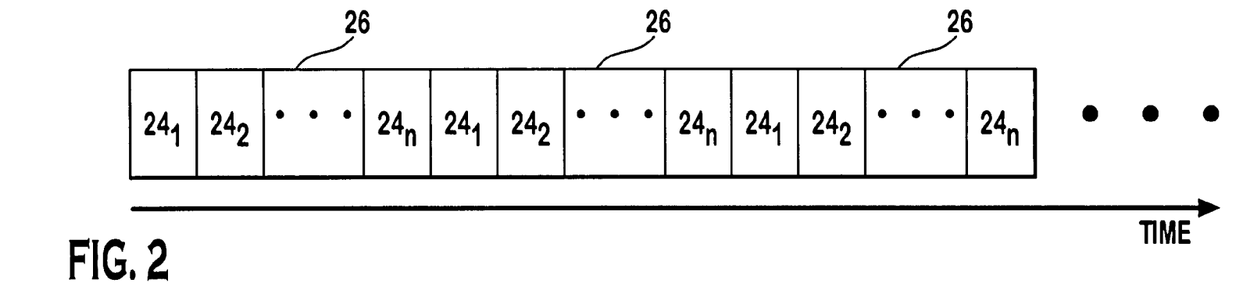
FIG. 2 is an illustration of time slots in repeating frames.

Also, to more efficiently use the spread spectrum, TDD/CDMA systems use repeating frames 26 divided into a number of time slots $24_1$–$24_n$, such as fifteen time slots, as illustrated in FIG. 2. In such systems, a communication is sent in selected time slots $24_1$–$24_n$ using selected codes. Accordingly, one frame 26 is capable of carrying multiple communications distinguished by both time slot $24_1$–$24_n$ and code. The use of a single code in a single time slot at a single frequency spectrum with a spreading factor of sixteen is referred to as a resource unit. If a lower spreading factor is used, the use of a single code in a time slot is considered more than a single resource unit. To illustrate, using a spreading factor of one for a code in a time slot is sixteen resource units.

Figure 3:
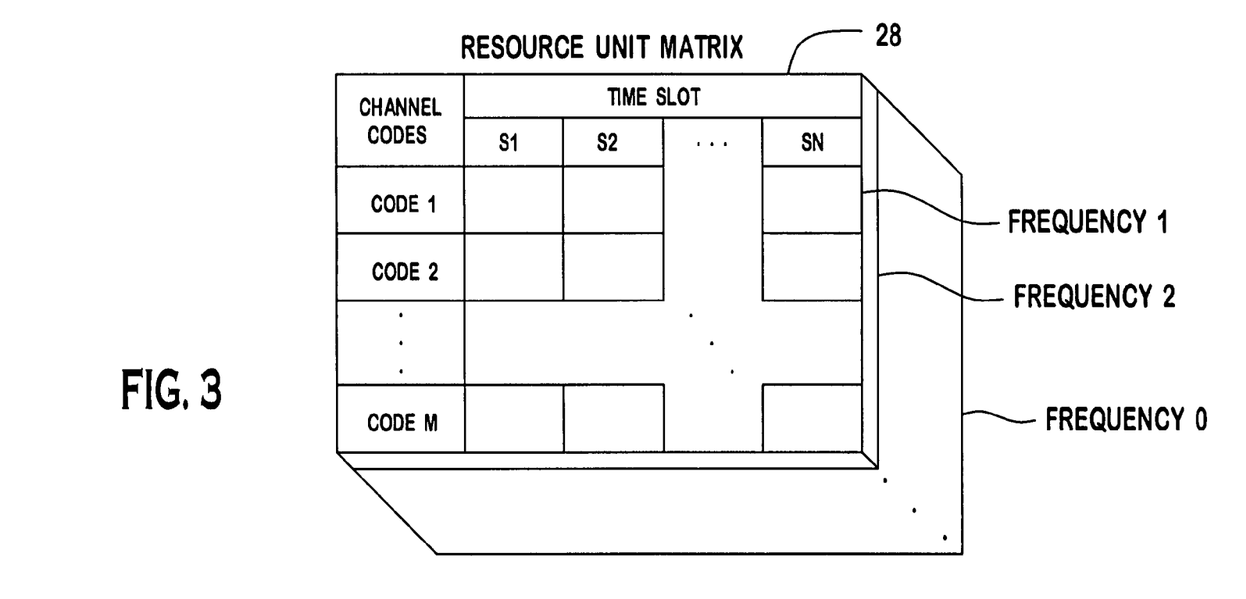
FIG. 3 is an illustration of resource units distinguished by channel code, time slot and frequency.

A system using N time slots, S1–SN, M channel codes, Code 1-Code M, and O frequency spectrums, Frequency 1-Frequency O,is illustrated in the Matrix 28 of FIG. 3. Each empty box in the Matrix 28 represents a single resource unit (if a spreading factor of sixteen is used). This Matrix 28 has a total of M×N×O resource units. A typical TDD system uses 15 time slots, 16 channel codes and one or multiple frequency spectrums. Based on the bandwidth required to support a communication, one or multiple resource units are assigned to that communication.

One problem in such systems is assigning resource units in the presence of radio interference. Radio interference has multiple causes, such as nearby radio frequency sources and cross interference by signals transmitted in neighboring cells. Sending a communication over a resource unit with a high interference level may result in a loss of signal data.

One technique for dealing with this problem is to measure the interference level in each time slot immediately prior to assigning resource units to a communication. Only resource units in time slots having acceptable interference levels will be assigned to the communication. Although this technique reduces the possibility of signal data loss, it does not eliminate all resource units suffering unacceptable interference levels. Additionally, measuring the interference levels immediately prior to assignment requires extensive monitoring using valuable system resources. Accordingly, there exists a need for an alternative approach for assigning resource units.

SUMMARY

Resource units are assigned within a cell of a wireless time division duplex communication system using code division multiple access. Each resource unit is associated with a time slot and a code. For selected ones of the cell's resource units, the code interference level is measured during that unit's time slot and using that unit's code. The code interference level is compared to a threshold to determine whether that unit has an acceptable code interference level. Resource units are assigned to communications out of the unit's having acceptable interference levels.

DETAILED DESCRIPTION OF THE PREFERRED EMBODIMENT(S)

Figure 4:
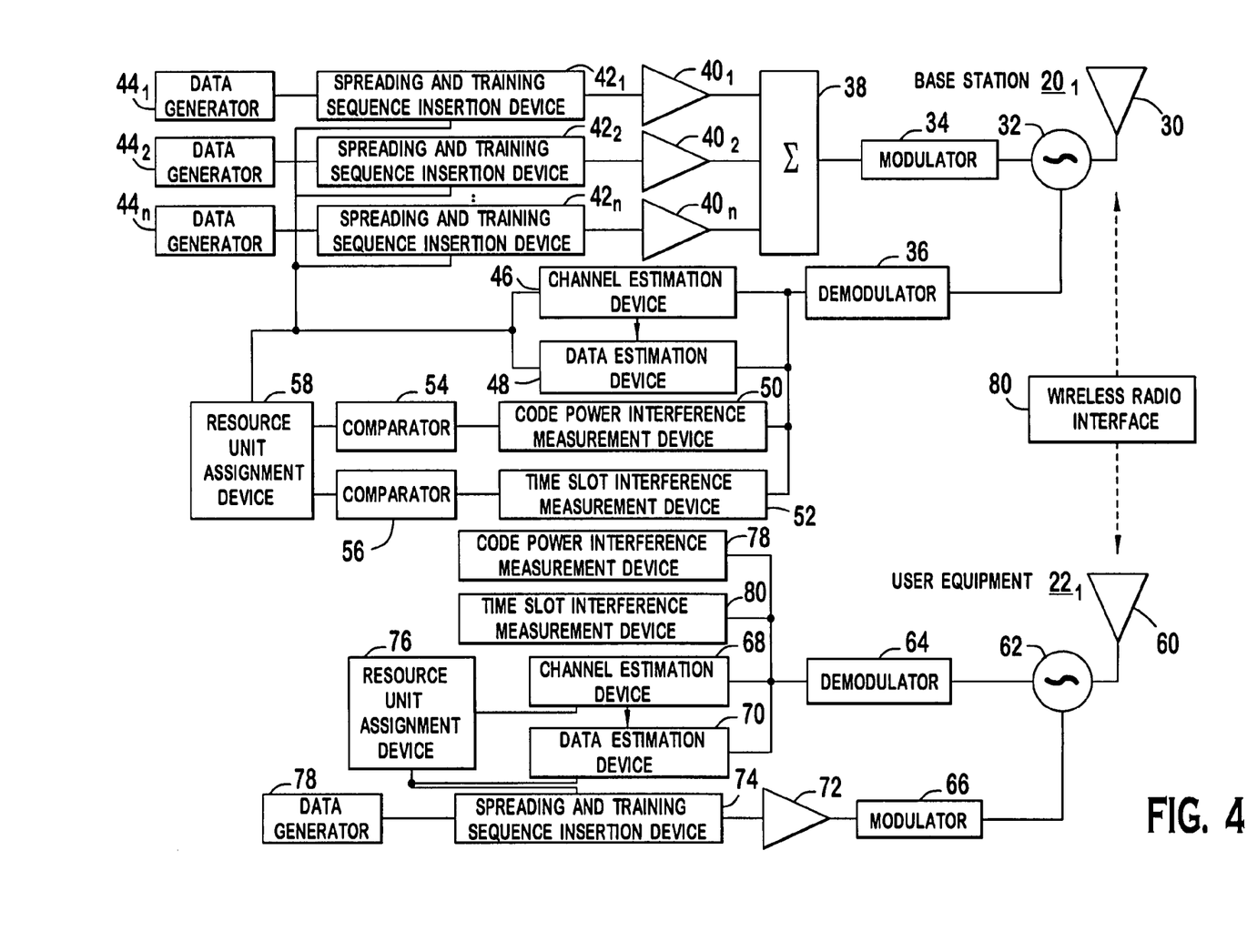
FIG. 4 is a simplified base station and user equipment.
Figure 5:
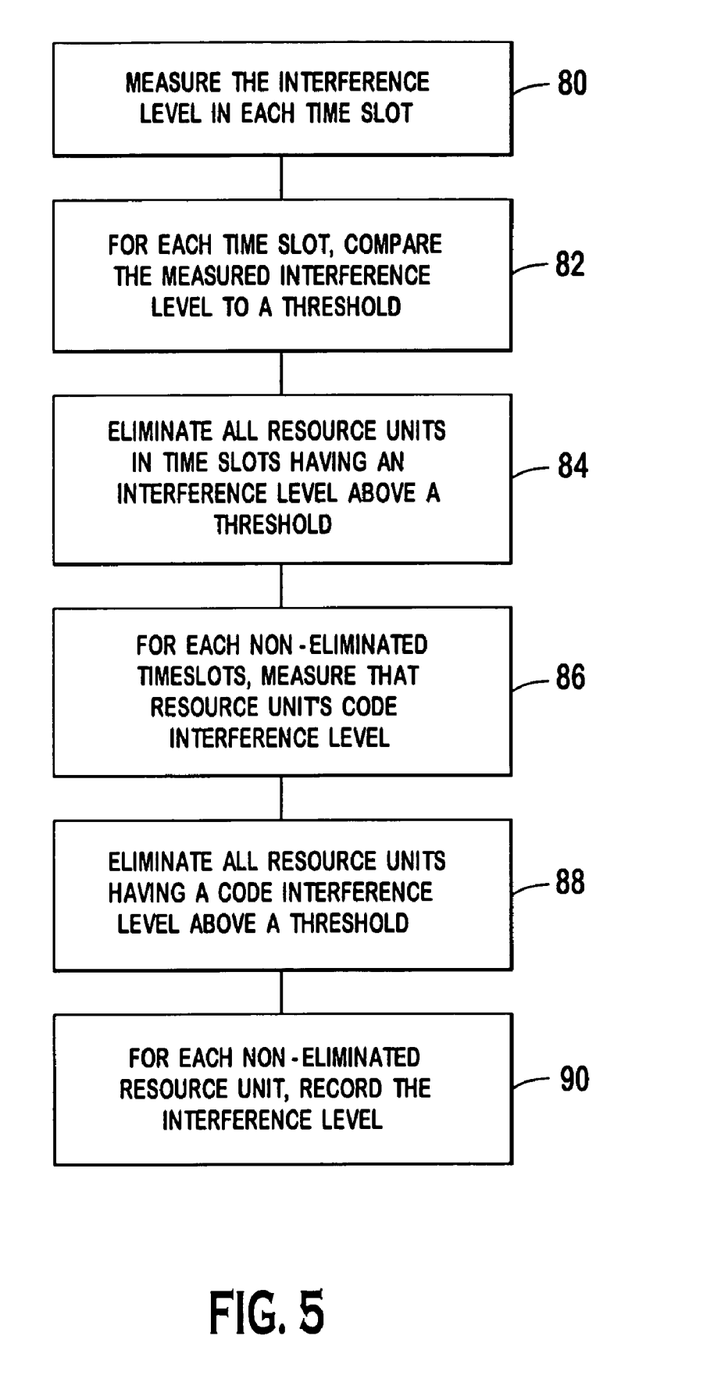
FIG. 5 is a flow chart of slow dynamic channel assignment.
Figure 6:
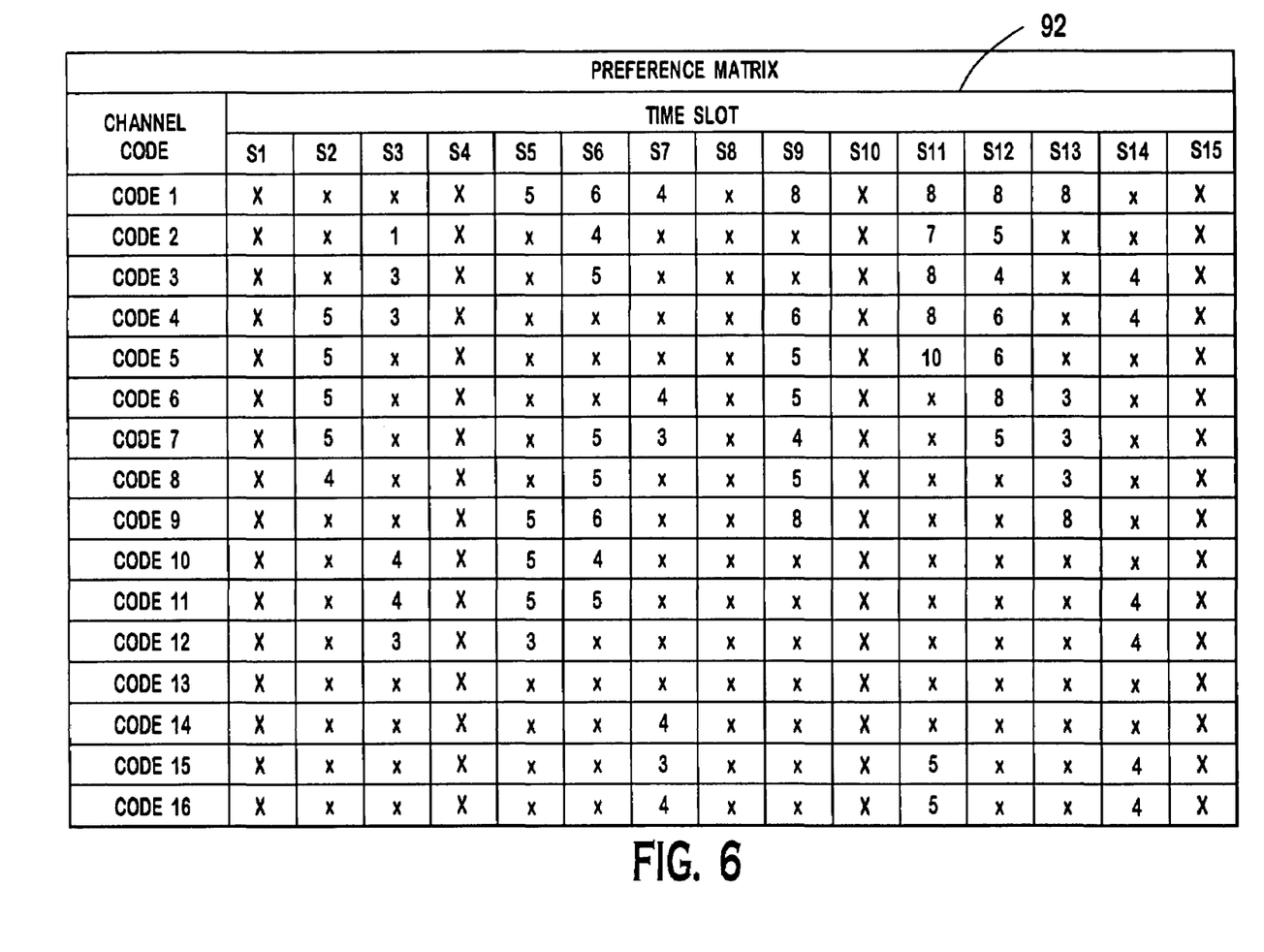
FIG. 6 is an example of a preference matrix.

FIG. 4 is a simplified base station $20_1$ and UE $22_1$ used to implement slow and fast dynamic channel allocation (DCA). FIG. 5 is a flow chart of slow DCA. The flow chart of FIG. 5 will be described in conjunction with the preference matrix 92 of FIG. 6. FIG. 6 is an illustration of a preference matrix 92 created as a result of slow DCA in a TDD/CDMA system having 16 channel codes,15 time slots and one frequency. Each box in the matrix 92 represents one out of 240 possible resource units.

Initially, the radio frequency power interference level in each time slot is measured, such as by interference signal code power (ISCP) or determining inter-cell interference, by link gain, step 80. The ISCP may be measured using the midambles of received communication bursts, although other ISCP measurement techniques may be used. Each time slot's interference is measured at either the base station $20_1$, UEs $22_1$–$22_n$ or both. For time slots interference measurements taken at the base station $20_1$, the base station's antenna 30 receives various radio frequency signals. The received signals are passed through an isolator 32 to a demodulator 36 to produce a baseband signal. A time slot interference measurement device 52 processes the baseband signal to measure the interference level, such as by ISCP, within each time slot $24_1$–$24_n$ of the frame 26.

For time slot interference measurements taken at the UEs $22_1$–$22_n$, the UE's antenna 60 receives various radio frequency signals. The received signals are passed through an isolator or switch 62 to a demodulator 64 to produce a baseband signal. A time slot interference measurement device 78 processes the baseband signal to measure the interference level, such as by ISCP, within each time slot $24_1$–$24_n$. The time slot measurements taken at each UE $22_1$–$22_n$ are typically signaled to the base station $20_1$. Alternately, the measurements may be multiplexed with the uplink data sent to the base station $20_1$ produced by the data generator 78.

A comparator 56 at the base station $20_1$ compares each time slot's interference level to a threshold, step 82. If only the base station $20_1$ took time slot interference measurements, each of these measurements is compared to the threshold. If only the UEs measurements are used, the comparator 56 compares the average for each time slots interference level to the threshold. If measurements from the base station $20_1$ and UEs $22_1$–$22_n$ are used, a weighted average of each time slot's measurement is used with the base station's given higher weight. If UE measurements or UE and base station measurements differ significantly, each will use its own measurements to determine time slot availability. Alternately, averaging may still be applied. If a time slot's interference level is above the threshold, all the resource units associated with that time slot are eliminated for potential assignment to communications, step 84. The resource unit assignment device 58 eliminates all the eliminated time slots' resource units in the stored preference matrix 92. To illustrate using FIG. 6, time slot 4 has an unacceptable interference level. All of the resource units in the column under time slot 4 are marked with an "X" indicating that they are eliminated from potential assignment. Additionally, other time slots are eliminated because they are reserved for other purposes, such as for a broadcast channel, and are likewise marked with an "X".

For each resource unit in time slots having acceptable interference levels, the code power interference level is measured, step 86. The code power measurements may be taken at the base station $20_1$ with code power interference measurement device 50, UE's code power interference measurement devices 68 or both. Code power measurements taken at the UE $20_1$ are either signaled or multiplexed with uplink data.

Figure 7:
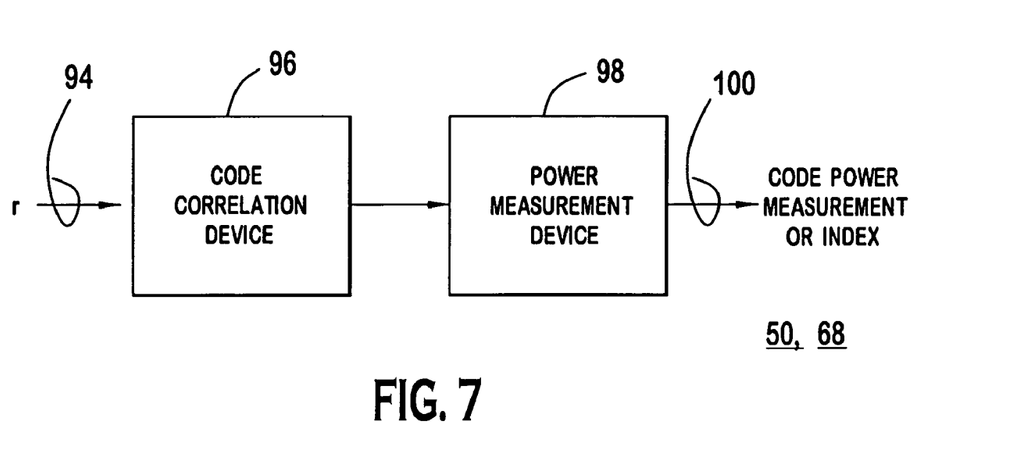
FIG. 7 is a code power interference level measurement device.

FIG. 7 depicts one possible code power interference measuring device 50, 68. The code power measurement 50, 68 is taken on a frequency spectrum where the codes of interest are to be transmitted. A signal 94 representing the received frequency spectrum is input into the code power measurement device. The input signal 94 may be a radio frequency, an intermediate frequency or a baseband signal. A code correlation device 96 correlates the input signal with the code of interest. The code correlation device 96 may be a despreader, a correlator or a matched filter. If the code of interest is a complex code, the correlator may perform a complex multiplication for the correlation. The power measurement device 98 sums the power of the correlated chips. If a complex code is used, the sum is the sum of the magnitude of the complex chips. The resulting sum is the code power 100 for the code of interest. The code power measurement is taken during each time slot to be measured. The measured power may be indexed into a short hand value, such as "1" to "10" in FIG. 6.

Each non-eliminated resource unit's code interference level is compared to a threshold at comparator 54. If only the base station $20_1$ took code interference measurements, these measurements are compared to the threshold. If only the UE's measurements are used, the comparator 54 compares the average of these measurements to the threshold. If measurements from the base station $20_1$ and UEs $22_1$–$22_n$ are used, a weighted average is used. Typically, the base station's measurement is given a higher weight. Alternately, the interference measurements may be UE $22_1$–$22_n$ specific. Furthermore, if UE measurements or UE and base station measurements differ significantly, each will use its own measurements. Each UE's measurement is compared to a threshold for use in resource assignments for that UE $22_1$–$22_n$. Each UE $22_1$–$22_n$ has its own preference matrix 92, if UE specific.

If a resource unit's code interference level is above the threshold, the resource unit is eliminated from being assigned, step 88. The resource unit assignment device 58 eliminates the resource unit in the preference matrix 92. To illustrate using FIG. 6, the resource unit associated with time slot 2 and channel code 1 has an unacceptable interference level and is marked in the matrix 92 with an "x". The resource unit assignment device 58 also stores in preference matrix 92 an indicator of the code interference level of the acceptable resource units, step 90. As shown in the preference matrix 92, the interference levels are indicated with a value of "1" to "10" with a "1" having a high marginally acceptable code interference level and a "10" having an extremely low code interference level.

The base station's resource unit assignment device 58 sends signals to the base station's data estimation device 48, channel estimation device 46 and spreading and training sequence insertion devices $42_1$–$42_n$ to control which codes and time slots are used by each device. The channel estimation device 46 and data estimation device 48 process the baseband signal in the time slots and appropriate codes assigned to the uplink communication's burst and the base station's scrambling code, $c^*_{scramb}$. The assigned time slots and codes are sent to the channel estimation device 46 and data estimation device 48 from the resource unit assignment device 58. The channel estimation device 46 commonly uses the training sequence component in the baseband signal to provide channel information, such as impulse responses. The channel information is used by the data estimation device 48 to estimate the data in the received burst.

Data to be sent to the UEs $20_1$–$20_n$, such as over a traffic channel, is generated by data generators $44_1$–$44_n$. The data is assigned one or multiple resource units based on the communications' bandwidth requirements by the resource unit assignment device 58. Each spreading and training sequence insertion device $42_1$–$42_n$ mixes the data with the base station's scrambling code, $c^*_{scramb}$, spreads the data and makes the spread reference data time-multiplexed with a training sequence in the appropriate time slots and codes of the assigned resource units. The output of the spreading and training sequence insertion devices are referred to as a communication burst. Each communication burst is subsequently amplified by a corresponding amplifier $40_1$–$40_n$. Each amplified communication burst is summed by a sum device 38 with any other communication burst created through other devices. The summed communication bursts are modulated by a modulator 34. The modulated signal is passed through an isolator 32 and radiated by an antenna 30, as shown, or, alternately, through an antenna array. The radiated signal is passed through a wireless radio interface 80 to the UEs $22_1$–$22_n$.

The base station's resource unit assignment device also sends the resource unit assignments to the UEs $22_1$–$22_n$. The assignments may be signaled to the UEs $22_1$–$22_n$ or multiplexed with traffic data. The sent assignments are used by the UE's resource unit assignment device 76 to determine which resource units are assigned to the UE's downlink and uplink channels.

For the received downlink data, the channel estimation device 68 and data estimation device 70 processes the received baseband signal in the time slots and appropriate codes assigned to the downlink communication burst and the base station's scrambling code, $C^*_{scramb}$. The assigned time slots and codes are sent to the channel estimation device 68 and data estimation device 70 from the resource unit assignment device 58. The channel estimation device 68 commonly uses the training sequence component in the baseband signal to provide channel information. The channel information is used by the data estimation device 70 to estimate the data in the received burst. Uplink data is generated by a data generator 78. The uplink data is assigned one or multiple resource units based on the communication's bandwidth requirements. Spreading and training sequence insertion device 74 mixes the data with the base station's scrambling code, $c^*_{scramb}$, spreads the data and makes the spread reference data time-multiplexed with a training sequence in the appropriate time slots and codes of the assigned resource units. The assigned resource units are sent to the spreading and training sequence insertion device 74 by the resource unit assignment device 76. The resulting sequence from the spreading and training sequence insertion device 74 is referred to as a communication burst. The communication burst is subsequently amplified by an amplifier 72. The amplified communication burst is modulated to radio frequency by the modulator 66, passed through an isolator 62 and radiated by an antenna 60 or, alternately, by an antennal array. The radiated signal passes through the wireless radio interface 80 to the base station $20_1$.

The preference matrix 92 used by the resource unit assignment device 58 may be updated on a per frame basis or on a more periodic basis. Using a statistical analysis, the preference matrix 92 may be updated from a period of minutes to a daily basis. In one approach, the user equipments $22_1$–$22_n$ measure the time slot interference level and the code interference level during the idle time between successive reception and transmission bursts. These measurements are sent to the base station $20_1$. In another approach, the measurements are taken on a periodic basis. In a different approach, the base station 201 signals the UE $22_1$–$22_n$ to take measurements. Accordingly, the measurements are taken on-demand. The base station $20_1$ updates the preference matrix 92 based on these measurements. The updated resource unit assignments are subsequently sent from the base station $20_1$ to the UEs $22_1$–$22_n$.

Figure 8:
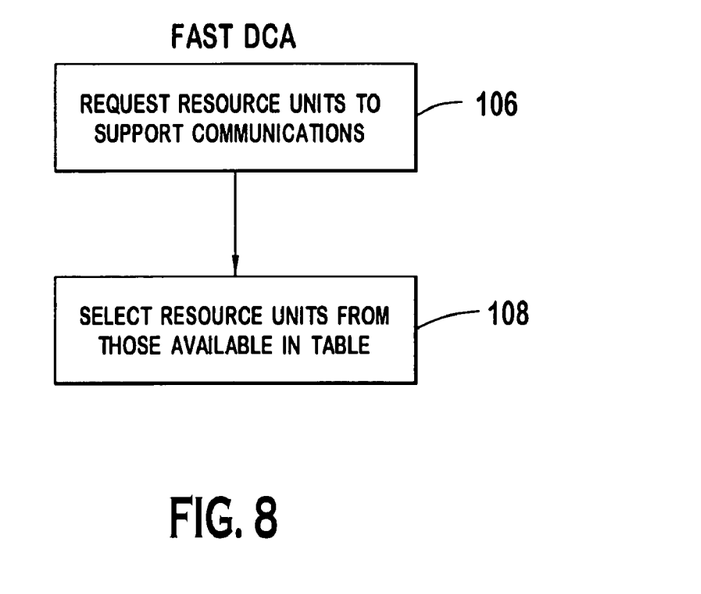
FIG. 8 is a flow chart of fast dynamic channel assignment.

FIG. 8 is a flow chart for fast DCA and will also be explained in conjunction with FIGS. 4 and 6. To support communications, a cell is assigned resource units for both the uplink and the downlink. The number of assigned resource units is based on the uplink and downlink bandwidth demand. When the cell requires additional resource units, the resource unit assignment device 58 will select additional resource units to allocate for uplink and downlink communications, step 106. Using the preference matrix 92, the resource unit assignment device 58 will assign a corresponding number of resource units from the available resource units, step 94. When demand decreases, conversely, the resource unit assignment device 58 releases the resource units.

One approach for selecting resource units is first available. Using this technique, the assignment device 58 searches through the preference matrix 92 until it reaches the first available acceptable time slot. To illustrate using matrix 92, if two resource units were requested, starting at code 1, slot 1 and first working left to right, code 1, slots 5 and 6 would be selected. These slots are the first encountered acceptable slots.

Another approach is least interfered channel. The assignment device 58 searches through the preference matrix 92 for the resource unit with the lowest code interference level. To illustrate, if one resource unit was selected, code 5, slot 11 having a value of "10" is selected. Since this approach searches through the entire matrix 92 before selecting a resource unit, it requires more processing time. However, since the selected resource unit has the lowest interference level out of the available resource units, communication interference is reduced.

In systems using adaptive power control, it is advantageous to assign consecutive time slots. In such systems, a modified approach may be used. Using first available, the first available number of consecutive time slots would be assigned. For instance, if three time slots were to be assigned, code 1, S5–S7 would be selected. Using least-interfered channel, the consecutive time slots with the least interference are selected. For instance, if three were assigned, code 1, S11–S13 would be selected.

Similarly, to minimize the number of time slots used, multiple codes within a time slot are assigned, such as codes 1–3, S11. Additionally, a hybrid approach, such as blocks, may be used—i.e. for four resource units, code 1, S11–S12 and code 2, S11–S12.

One technique for assigning resource units is to minimize the number of time slots used. By reducing the number of used time slots, interference to neighboring cells is reduced. Using the multiple threshold technique, when resource units need to be allocated initially, the system finds the time slot or slots with the maximum number of codes available as determined by the interference level. As a result, the minimum number of time slots are allocated for a given number of resource units.

After the initial allocation, resource units are assigned to the time slots which already allocated codes to communications but still have codes available first. This allocation prevents additional time slots from being used. After the previously assigned time slots are used, new time slots are assigned with the time slot having the highest number of available codes being assigned first.

Figure 11:
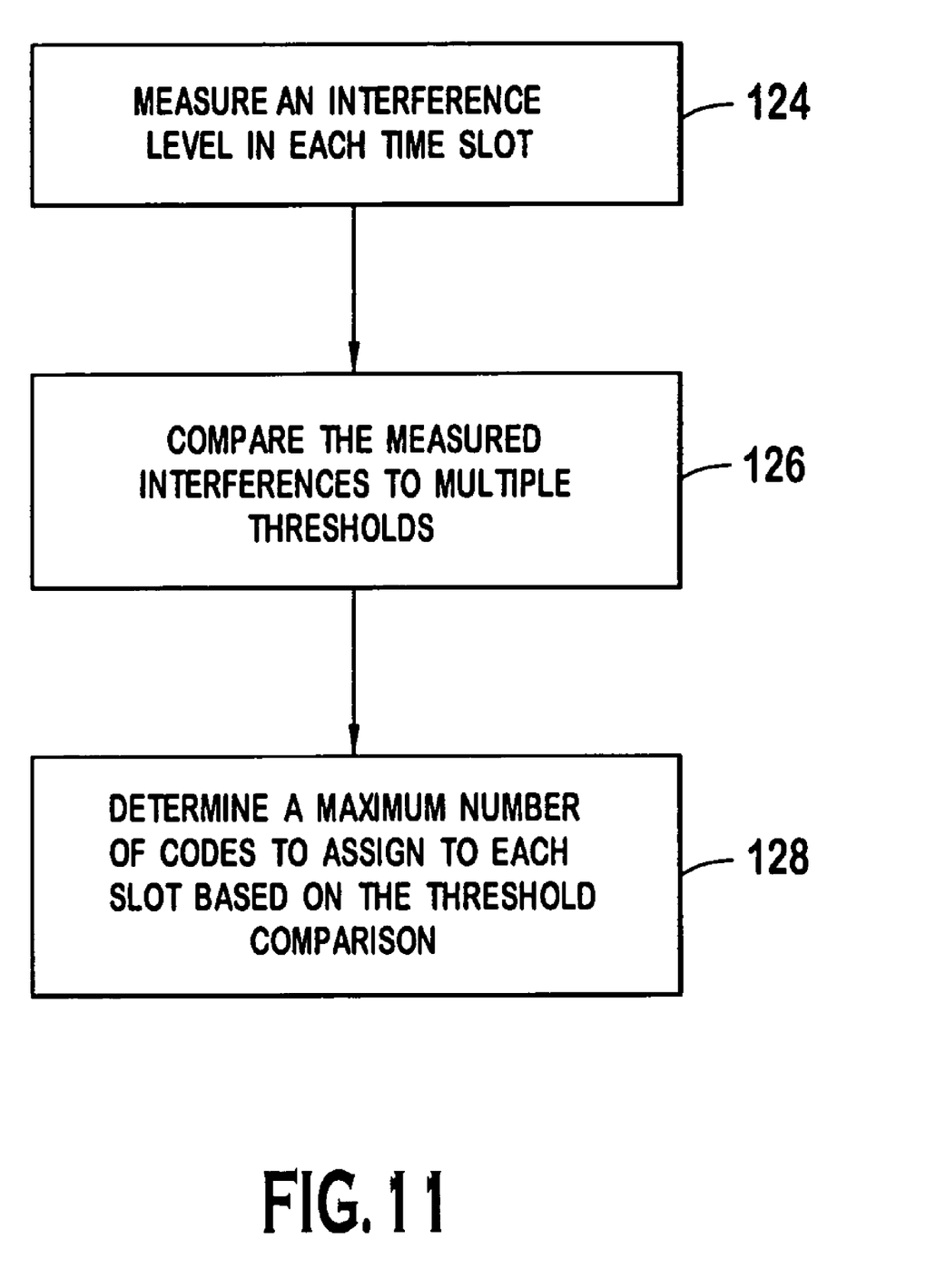
FIG. 11 is a flow chart of multiple threshold code assignment.

FIG. 11 illustrates an approach for controlling the maximum number of codes assigned to a time slot. Generally, it is desirable to limit the number of time slots used. By not using time slots, these time slots are left available for use by other cross interfering cells.

Figure 9:
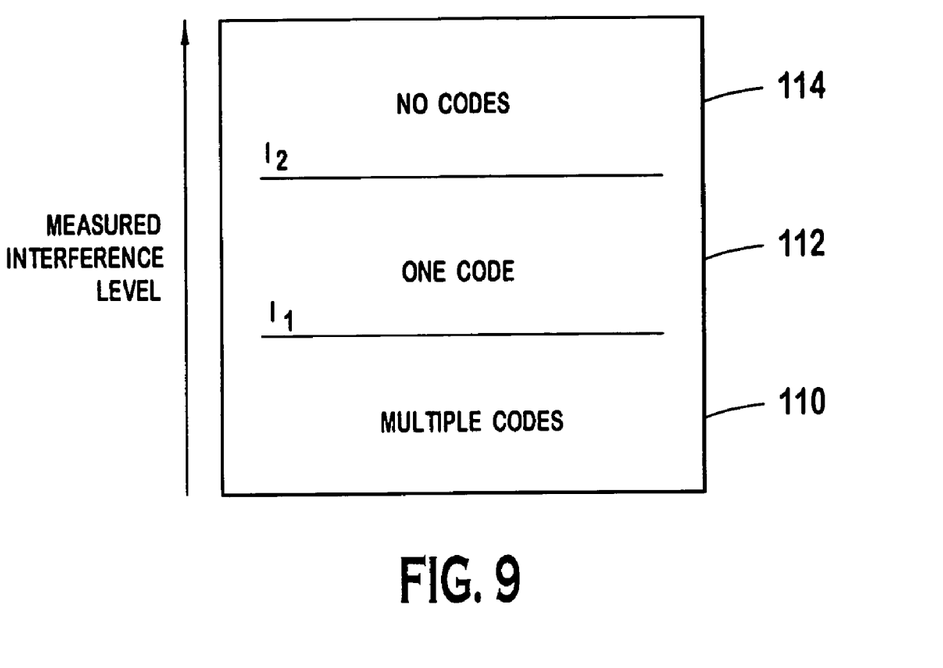
FIG. 9 is an illustration of two threshold code assignment.

An interference level for each time slot is measured, 124. To determine the number of codes that should be used in each time slot, a multiple threshold scheme is utilized. The measured interference for each slot is compared to the multiple thresholds 126, and a maximum number of time slots to assign is determined from the comparison, 128. One multiple threshold scheme uses two thresholds, $I_1$ and $I_2$ as shown in FIG. 9. If the measured interference level is below $I_1$, multiple codes 110 may be assigned to the time slot. If the measured interference level is between $I_1$ and $I_2$, one code 112 may be assigned in these time slots. If the interference level is above $I_2$, no codes 114 may be used in this time slot.

Figure 10:
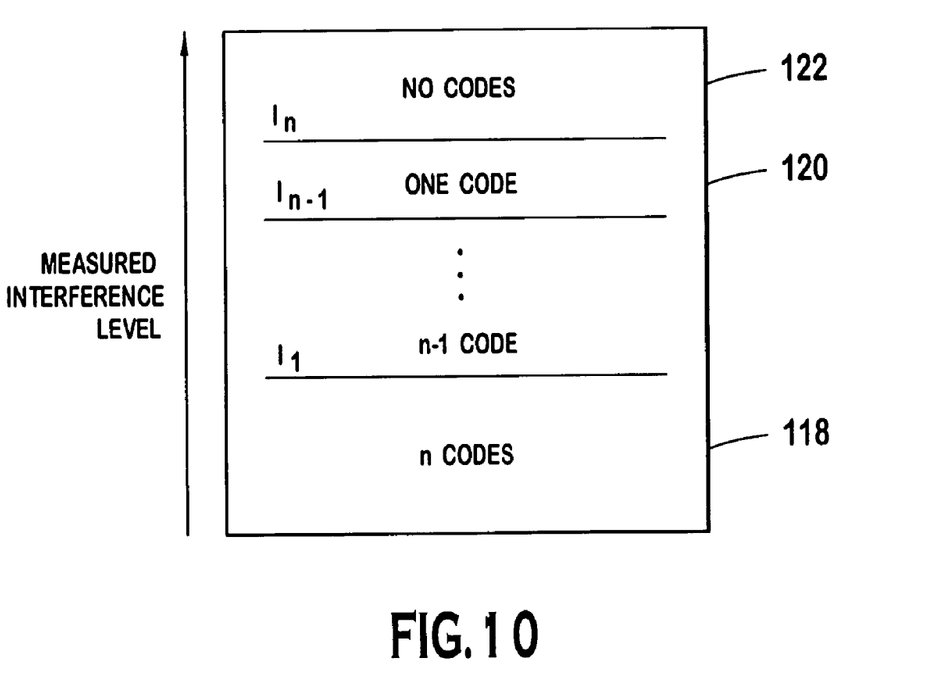
FIG. 10 is an illustration of multiple threshold code assignment.

Another multiple threshold scheme uses more than two interference levels, $I_1, I_2, \ldots, I_n$. If the measured interference level is above $I_n$, no codes 122 are available. If between $I_n$ and $I_{n-1}$, one code 120 is available. The codes available for the time slot keep increasing by one per each threshold, $I_{n-2}$, $I_{n-3}$, etc., until the interference level is less than $I_1$. When the interference is less than $I_1$, n codes 118 are available for the time slot.

What is claimed is:

1. A method of assigning resource units within a cell of a wireless time division duplex communication system, each resource unit is associated with a time slot and a code, the method comprising:

for selected ones of the cell's resource units, measuring a code interference level during that resource unit's time slot using that resource unit's code and determining whether that resource unit has an acceptable code interference level based on a comparison of that resource unit's measured code interference level with a threshold;

assigning resource units to communications out of the selected ones resource units having an acceptable code interference level by assigning multiple resource units of a user equipment to consecutive time slots; and producing a preference matrix indicating which of the selected ones resource units are eliminated.

2. A method of assigning resource units within a cell of a wireless time division duplex communication system, each resource unit is associated with a time slot and a code, the method comprising:

for selected ones of the cell's resource units, measuring a code interference level during that resource unit's time slot using that resource unit's code and determining whether that resource unit has an acceptable code interference level based on a comparison of that resource unit's measured code interference level with a threshold;

assigning resource units to communications out of the selected ones resource units having an acceptable code interference level by assigning multiple resource units of a user equipment to a same time slot; and producing a preference matrix indicating which of the selected ones resource units are eliminated.

3. A wireless time division duplex communication system using code division multiple access comprising:

a base station comprising:

a resource unit assignment device for receiving code interference levels for resource units, producing a preference matrix using the received code interference levels, and assigning resource units to communications using the preference matrix; and a user equipment comprising:

a code power interference measurement device for measuring code interference levels of a resource unit using that unit's code during that unit's time slot; and a resource unit assignment device for outputting code power interference measurements for use by the base station and assigning resource units to communications using the resource units assigned by the base station.

4. The system of claim 3 wherein the base station further comprises a code power interference measurement device for measuring code interference levels of a resource unit using that unit's code during that unit's time slot.

5. The system of claim 3 wherein the user equipment further comprises a time slot interference measurement device for measuring an interference level of a time slot and the resource unit assignment device sending the time slot interference measurements for use by the base station.

6. The system of claim 4 wherein the base station further comprises a time slot interference measurement device for measuring an interference level of a time slot.

7. The system of claim 3 wherein the user equipment measures code interference levels on a periodic basis.

8. The system of claim 3 wherein the user equipment measures code interference levels when instructed by the base station.

9. The system of claim 5 wherein the base station resource unit assignment device eliminates ones of the selected time slots having a measured interference exceeding a threshold.

10. The system of claim 9 wherein the preference matrix indicates eliminated time slots.

11. The system of claim 3 wherein the assigning resource units is performed by first assigning a resource unit in the preference matrix with a lowest interference level.

12. The system of claim 3 wherein the assigning resource units is performed by assigning multiple resource units of a user equipment to consecutive time slots.

13. The system of claim 3 wherein the assigning resource units is performed by assigning multiple resource units of a user equipment to a same time slot.

* * * * *

UNITED STATES PATENT AND TRADEMARK OFFICE
CERTIFICATE OF CORRECTION

PATENT NO. : 6,993,002 B2  Page 1 of 1
APPLICATION NO. : 09/901289
DATED : January 31, 2006
INVENTOR(S) : Pan et al.

It is certified that error appears in the above-identified patent and that said Letters Patent is hereby corrected as shown below:

ON THE TITLE PAGE

At section (56), OTHER PUBLICATIONS, page 1, right column, line 12, after the word "Key", delete "Telecommunications Key".

TITLE PAGE IN THE ABSTRACT

At section (57), ABSTRACT, right column, line 3, after the word "resource", delete "units" and insert therefor --unit--.

IN THE SPECIFICATION

At column 1, line 52, after "1-Frequency", delete "O,is" and insert therefor --O, is--.

At column 3, line 20, after the words "only the", delete "UEs", and insert therefor --UE's--.

At column 3, line 21, after the word "time", delete "slots", and insert therefor --slot's--.

Signed and Sealed this

Nineteenth Day of December, 2006

JON W. DUDAS
*Director of the United States Patent and Trademark Office*